United States Patent [19]

Ward

[11] 3,711,658

[45] Jan. 16, 1973

[54] APPARATUS AND METHOD FOR CUTTING RECORD DISCS

[75] Inventor: Donald H. Ward, Glen Ellyn, Ill.

[73] Assignee: Borg-Warner Corporation, Chicago, Ill.

[22] Filed: Dec. 24, 1969

[21] Appl. No.: 887,852

[52] U.S. Cl...179/100.4 C, 179/100.1 A, 179/100.2 S

[51] Int. Cl.........G11b 3/00, G11b 5/86, G11b 15/06

[58] Field of Search.....179/100.1 A, 100.4, 100.4 C, 179/100.4 D, 100.2 E; 274/3, 46 R, 46 C; 346/174.1 R

[56] References Cited

UNITED STATES PATENTS

| | | | |
|---|---|---|---|
| 2,563,647 | 8/1951 | Hammond | 179/100.3 R |
| 3,483,633 | 12/1969 | Geils | 35/9 |
| 2,585,291 | 2/1952 | Wittel | 179/100.4 C |
| 2,792,454 | 5/1957 | Redlich | 179/100.4 C |
| 3,405,238 | 10/1968 | Hurvitz | 340/174.1 P |
| 2,921,992 | 1/1960 | Bick | 179/100.4 D |

FOREIGN PATENTS OR APPLICATIONS

| | | | |
|---|---|---|---|
| 931,830 | 7/1963 | Great Britain | 274/3 |

*Primary Examiner*—Bernard Konick
*Assistant Examiner*—Raymond F. Cardillo, Jr.
*Attorney*—Donald W. Banner, William S. McCurry and John W. Butcher

[57] ABSTRACT

Apparatus and method for production of record discs, of particular utility in the production of permanent record phonograph discs for use with a teaching machine of the U.S. Pat. No. 3,483,633 type. A source (tape player) for messages to be repeated on the disc is provided, that can be activated to deliver a single message on command, which single messages are successively transferred from the source to a magnetic tape loop affixed to the turntable of a disc cutting lathe, and from that tape loop, repeatedly to the cutting head of the lathe and thus, repeatedly, to the disc. An automatic counter and programming unit is provided which counts the number of times that the message has been cut on the disc and, after a preselected number of cuttings, activates the tape machine, erases the previous message on the tape loop and records a second message thereon from the source which, in turn, is repeatedly cut into the disc on succeeding revolutions of the turntable. The process is automatically repeated to cut a succession of bands each made up of repeated different messages. Also disclosed in a system for recording the messages on the tape of the message source wherein each attempted message is recorded on the traveling tape after an indexing "stop" signal and, if the attempt is abortive, the "stop" signal is erased as it reaches a predetermined place in the tape travel mechanism and thus later passed over when cutting the record disc.

11 Claims, 4 Drawing Figures

Inventor
Donald H. Ward
By Richard G. Kinney
Attorney

Inventor
Donald H. Ward
By Richard G. Kinney
Attorney

PATENTED JAN 16 1973

3,711,658

Inventor
Donald H. Ward
By Richard G. Kinney
Attorney

APPARATUS AND METHOD FOR CUTTING RECORD DISCS

BACKGROUND OF THE INVENTION

The present invention relates to a recording system of the general type that may be employed in the manufacture of phonograph record discs. More particularly, the present invention relates to a novel system for the recording or cutting of a master record disc of the type that includes a plurality of successive repeated individual messages, each located on the disc in a specified orientation for synchronization of audio and visual effects.

The present invention finds a particular utility when employed in the manufacture of a record disc of the type that may be used with the audio-visual education or teaching machine disclosed and claimed in the copending application for U.S. Pat. Ser. No. 615,547 filed on Feb. 13, 1967 in the names of Alfred E. Geils, William J. Raymond, Richard W. Roberts, and Peter K. Shreck entitled "Audio-Visual Educational Apparatus" on which application U.S. Pat. No. 3,483,633 has now issued. This patent is assigned to the same assignee as is the present invention. In such machines a record disc is employed which has a spiral track and is divided into a plurality of bands. Each band has a group of, for example, twenty individual encircling grooves each of which repeats the same information or message as the other grooves in the band. Each message is completed in under one revolution of the disc and each starts from approximately the same angular position on the disc. With this arrangement the machine's phonograph arm's set down position need not be controlled with such precision as to set down in exact register with an individual groove when the arm is moved to a new band, but need only be controlled to set down within a strip or band of adjacent grooves on the record. The machine when functioning as a teaching machine may repeat the same message over again to, for example, ask a question again of the student when he has missed or incorrectly answered that question. The machine also synchronizes the audio messages with a visual display.

The present invention is concerned with an expedient and economical system for the manufacture of records of this general type.

SUMMARY OF THE INVENTION

In accordance with a preferred mode of the invention a cycling erasable recording media whose period of cycling is related to the cycle period of the record disc, as a one-to-one relationship formed by affixing a magnetic loop about the cutting turntable. The message is recorded on the cycling media and repeatedly picked up therefrom and cut in successive grooves of the disc. In this manner a message may be repeatedly cut with each cut beginning and ending at the same angular position on the disc. After the desired number (e.g. 20) of cuts have been made, the message is erased and a second message recorded on the cycling media and a second band of repeated cuts of the same angular position recorded on the disc. In this manner a number (e.g. 40) of bands may be cut each with a different repeated message, but each message having a defined angular position.

The invention, together with further advantages thereof, may best be understood by reference to the following description taken in connection with the accompanying drawing, in the several figures of which like reference numerals identify like elements.

DETAILED DESCRIPTION

It is the conventional process for making phonograph record discs to first record the message or performance on high quality magnetic tape and to use this magnetic tape either with or without alterations to cut a master record disc. A master record disc is in turn used to form a mold or die from which the ordinary commercial record disc are molded or stamped.

As stated above, the present invention is primarily concerned with the making of a record for use with an educational or teaching machine or the type described in the aforementioned U.S. application Ser. No. 615,547. While the invention may find other applications and uses, for particularity it will be described in connection with the manufacture of such a record disc. That disc requires a plurality of individual messages to be located on the disc in specified orientation for the synchronization of audio and visual effects. More over, to ease the tolerances for the record player portions of the individual teaching machine, to allow for wear and variances therein, and to allow for automatic repeating of the message, it is desired that the individual messages be repeated in the same orientation in a plurality of successive grooves forming a band thereon.

Figure 1:
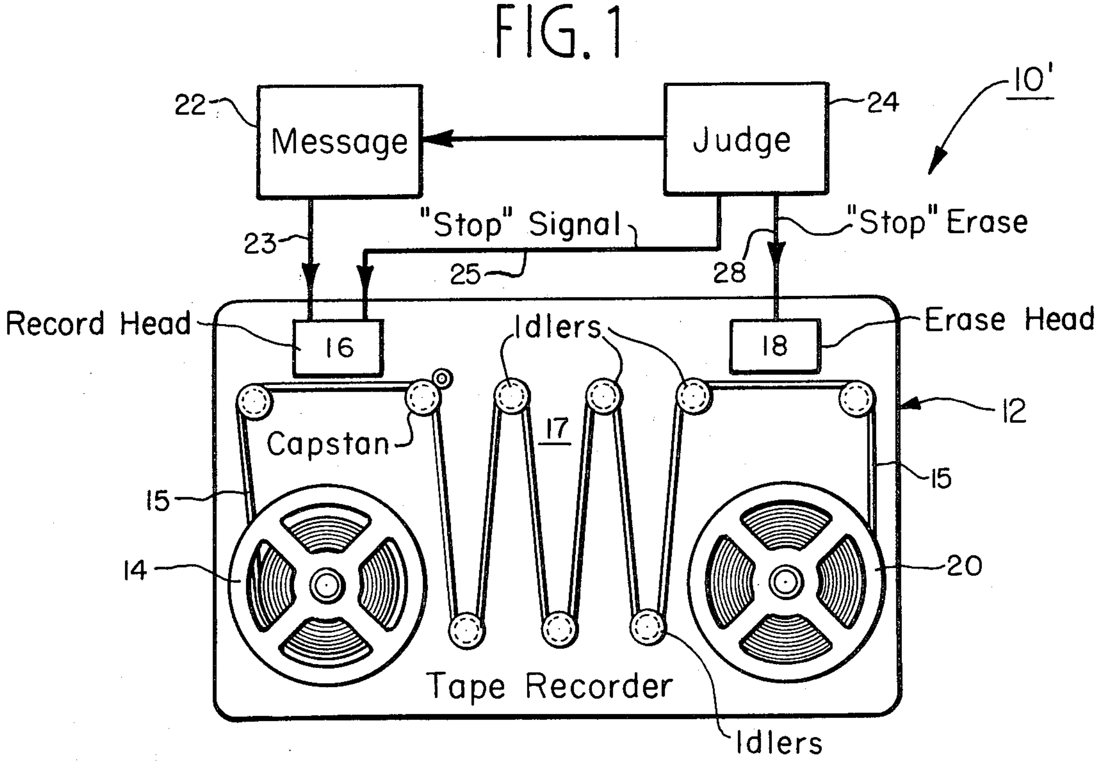
FIG. 1 is a schematic block diagram of the process of recording a master tape for use in the present recording system in accordance with present invention.

Referring to FIG. 1, there is depicted means for carrying out a process, generally designated 10', for producing a master magnetic tape of the type that may be used in the producing of such a phonograph record. The process illustrated in FIG. 1 together with the process of FIG. 2 constitute the system 10 of the present invention. The system 10 is preferably carried out in two stages although it is possible to carry out the entire process continuously.

The tape recording process 10' includes a tape recorder generally designated 12 of an unusual type. The recorder 12 contains a first reel 14 from which a dual channel tape 15 is fed past a conventional recording head 16 and thereafter through a capstan and idler system which is generally designated 17. The length of the tape 15 from the head 16 through the system 17 is selected to represent a standard message length for the record disc. In one particular form of the record disc for the afrementioned teaching machine each message length comprises a period of about four seconds. At the end of this length, after the idler system 17, is placed an erase head 18. The head 18 is located just prior to transferring of the tape 15 to a second or receiving reel 20. The message is produced for recording by a message source 22, which may be a human announcer who reads a prepared script. From the source 22 it is fed, as indicated by the line 23, to the record head 16. To coordinate the placing of the individual messages a judging station 24 is provided. This station 24, to institute a message, communicates an indexing signal, which we will here term a "stop" signal, to both the message source or speaker 22 and to the tape recorder. This "stop" signal is preferably a tone signal of short duration which is recorded on one channel of the tape a short time prior to the recording of the message on a second channel of the tape. If the message, in the opinion of the judge 24, is properly executed by the message source or speaker, he can then repeat the "-stop" signal to the speaker at the conclusion of a four second period plus a certain delay time.

The judge 24 may also conclude that the message was mistakenly given or that it ran over the period allowed for the message. In this case, the judge 24 institutes an abort signal which is communicated, as indicated by the line 28, to the erase head 18 at the proper time so as to erase the "stop" signal from the tape.

The present system has the advantage of being able to accommodate such errors on the part of the message source 22 with a minimum of trouble or expense. It should be noted that it is not necessary to erase the abortive message from the tape and that the message unit sequence can be begun over again by the judge, station 24, immediately. Indeed, should a verbal mistake or flub be made in the message, the message may be begun over again at the direction of the judge 24 at any time. In this manner successful messages may be recorded each preceded by a "stop" signal without the need for reversing the tape or erasing the entire flub message. Once a flub has occurred a new message might be started without an unnecessary delay.

Figure 2:
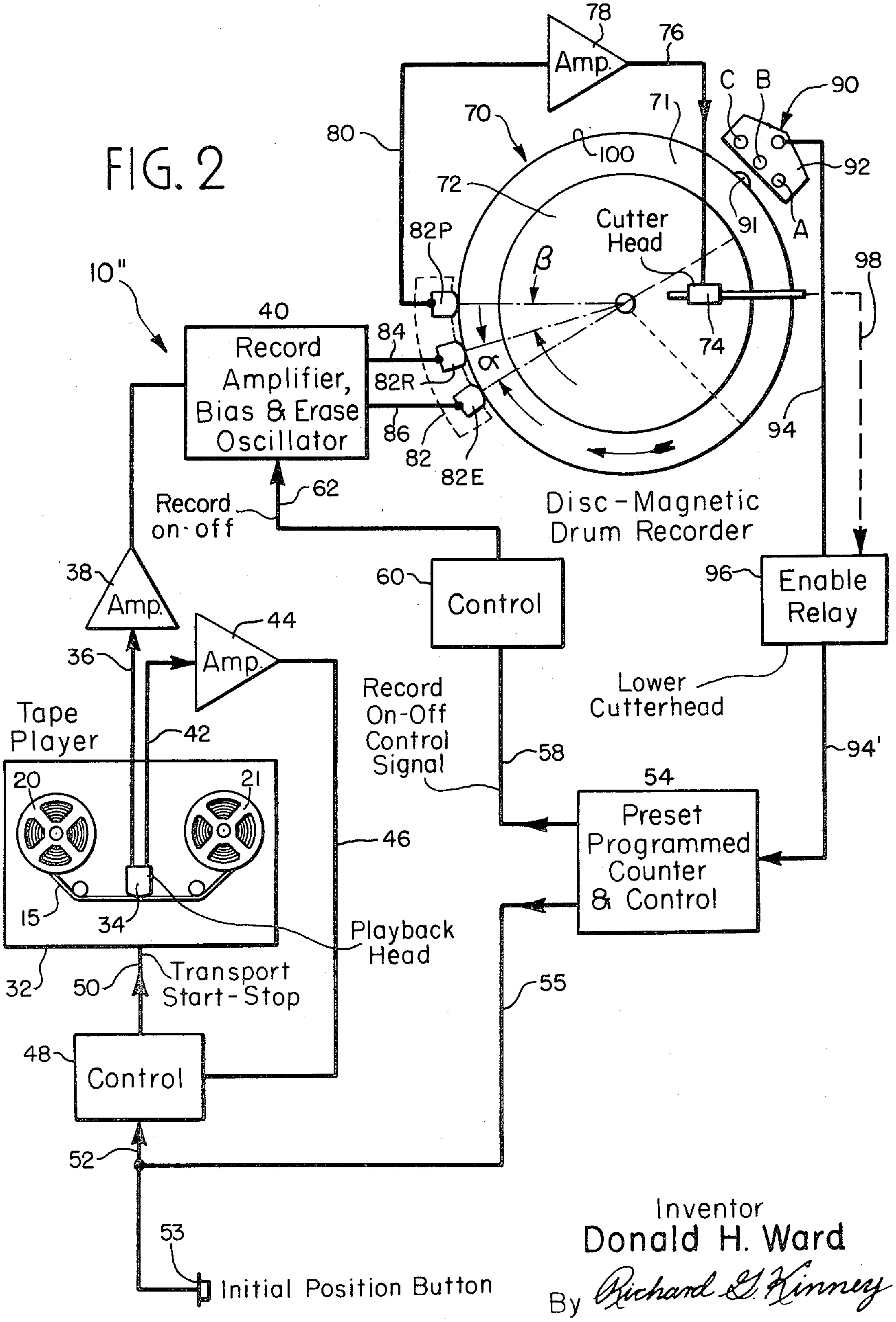
FIG. 2 is a schematic block diagram, partially in circuit diagram, of the record disc cutting system employing the master tape developed by the process of FIG. 1, to cut a master record disc in accordance with the present invention.

Referring now to the FIG. 2, the second portion of the system of the present invention is there depicted and is generally labeled 10''. This stage of the system 10'' the tape reel 20 and tape 15 from the prior stage is placed on a tape player 32 and fed to a take-up reel 21 past a conventional playback head 34. From the playback head 34 the first channel signal containing the messages is fed as indicated by line 36 to an amplifier 38 and then to a recording amplifier, bias, and erase oscillator unit 40. The "stop" signals which are placed on the second channel of the tape 15 are picked up by the playback head 34 of the tape player 32 and fed, as indicated by a line 42, to a second amplifier 44. The amplified "stop" signals are fed from the output of the amplifier 44 via a line 46 to control relay unit 48 which governs the starting and stopping of the tape transport of the tape player 32, as indicated by the line 50. The control relay unit 48 functions to start and stop the tape transport unit of the tape player 32. The control 48 also is governed by the input signals communicated to it on line 52 from either an initial starting button 53 or a start signal communicated from a program counter unit 54 via line 55. The unit 54 is a pre-set program counter and has an additional output communicator line 58 to control a second control relay unit 60. The output of this control relay unit 60 is coupled, as indicated by a line 62, to the recording amplifier and erase unit 40 to control its operation.

Also provided as a major portion of the system of the present invention is a record disc cutting lathe generally designated by the numeral 70 which lathe includes turntable 71 upon which a record master disc 72 is positioned for having record grooves cut thereon by a cutter head 74. The signals to determine the information of an individual record groove are communicated to the cutter head via line 76 from an amplifier 78. In accordance with one aspect of the invention, the lathe 70 and turntable 71 are equipped with a cycling magnetic recording media such as a partial loop of tape 100 secured on its outer periphery. The signal for the cutter head is derived via line 80 from a magnetic pick-up 82P which is part of a recording head housing unit 82 which further includes a recording head 82R and an erase head 82E. The playback head 82P picks up whatever signals are recorded on the magnetic tape encircling the outer periphery of the turntable 70 and communicates this, via line 80, to the amplifier 78 which in turn communicates it to the cutter head 74, to thereby cut a message into a groove of the record disc 72.

The recording head 82R serves to place a message onto the tape 100 on the outer periphery of the turntable 71, and is driven over the line 84 by the unit 40. The unit 40, as symbolized by line 86, also governs the operation of the erase head 82E. The pre-set program counter unit 54 which serves in the operation of both the tape player 32 and the recording amplifier and erase unit 40 is, in turn, governed by an input from the master disc-cutting lathe unit 70. A revolution counting unit 90 is provided adjacent to the turntable 71. This unit 90 preferably consists of a permanent magnet 91 of a relatively small mass, which is affixed to the turntable 71 and rotates with it. A reed switch unit 92, comprising a plurality of reed switches, is positioned at a fixed location adjacent to the turntable 71 and is activated by a passage of the magnet 91, to communicate signals, via line 94, past an enabling relay switch 96, and via a line 94', to the pre-set program counter 54. As symbolized by the dashed line 98 the enabling relay unit 96 is operated whenever the cutting head 74 is lowered into an operational position.

The message, as was mentioned before, is chosen to be of such a time length that it occupies no more than a predetermined length when cut into the record disc 71. This length is less than a full revolution, as, for example 320°. The remaining 40° of each circle is allowed for a pause between repeated messages to allow time to stop and start the teaching machine turntable. The heads 82 are separated by a convenient angle such as $\alpha$ (alpha) and $\beta$ (beta) in FIG. 2, equal to, for example, 10° each.

Figure 3:
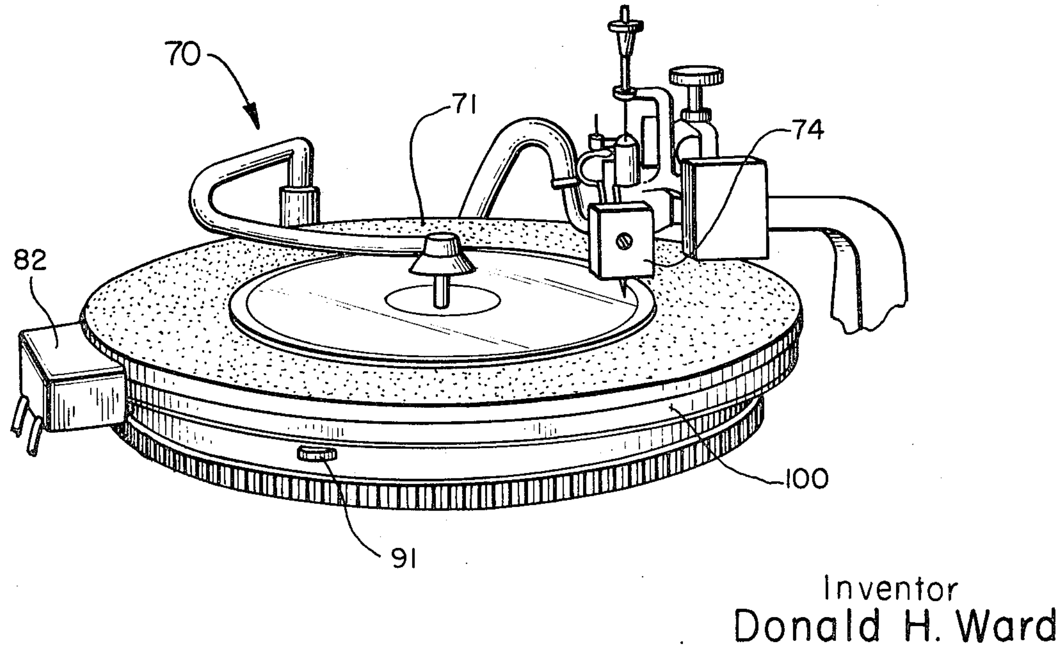
FIG. 3 is a perspective view of a portion of the disc cutting lathe for illustrating one feature of the present invention.

The configuration and orientation of the disc cutting lathe unit 70 may be best understood by referring to FIG. 3. As can there be seen better, the magnetic tape 100 is positioned in a groove in the vertical rim of the turntable 71 and the magnet 91 is positioned below the tape 100. This prevents interference by the magnet 91 with the tape 100 or the recording heads of the unit 82.

The particular lathe unit 70 illustrated in FIG. 3 is a modification of the disc cutting lathe AM–131 manufactured by the George Neumann Company of West Berlin, Germany. Of course, other lathes may be employed.

The magnetic tape 100 is preferably affixed with a slightly resilient backing to allow it to pass in very close approximation to the recording heads. The tape 100 preferably does not fully encircle the turntable, but falls short thereof by a gap of for example approximately 40° corresponding to the set down and start-up zone for teaching machine record player. This prevents any noise or inadvertently recorded message on the tape 100 from being repeated in that zone and insures a desirable silent gap between repeated messages.

Figure 4:
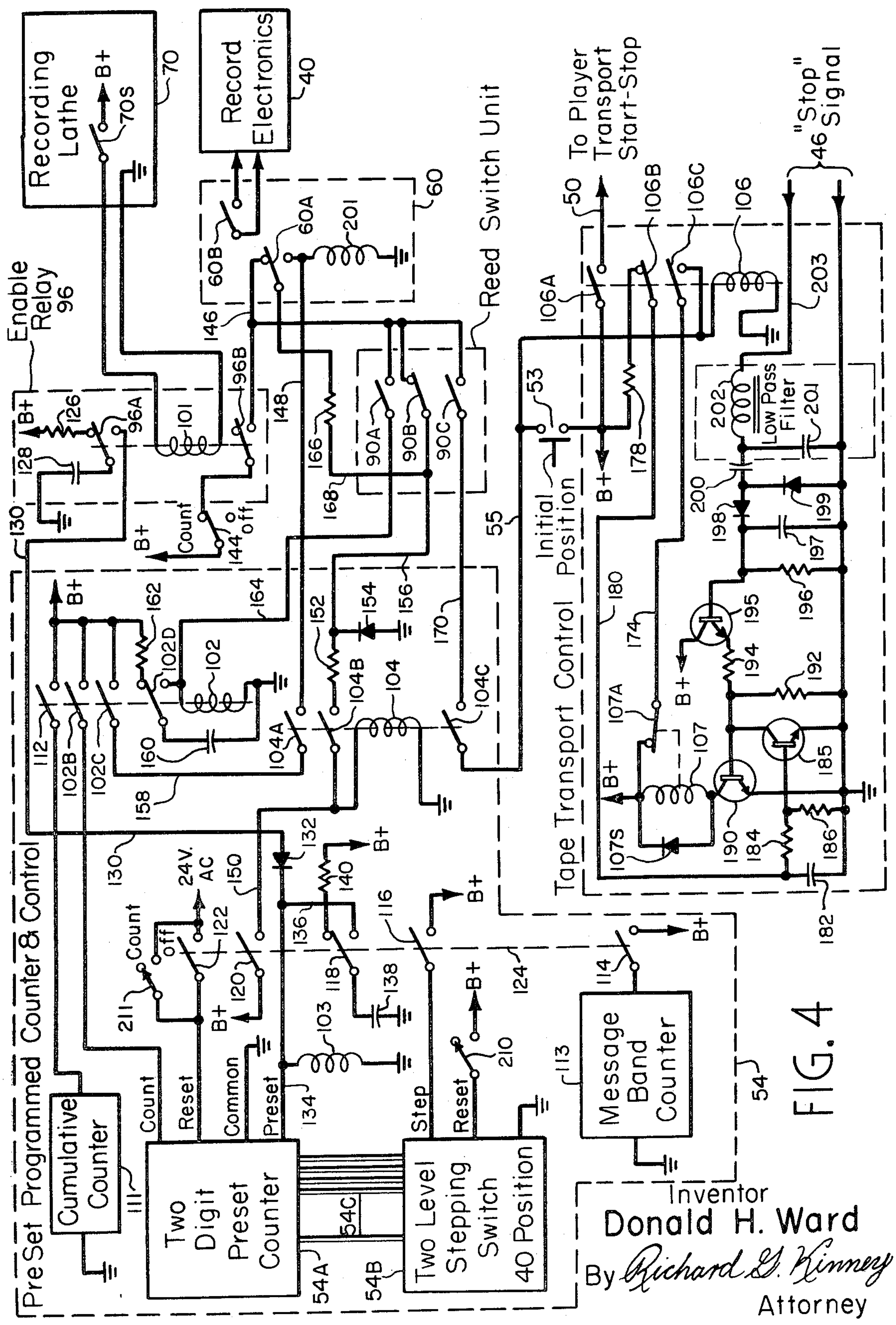
FIG. 4 is a detailed circuit diagram, partly in block diagram, of the control circuit for the record disc cutting system of FIGS. 2 and 3.

In FIG. 4 a detailed circuit diagram is depicted for the system of FIGS. 2 and 3. As best seen in this FIGURE the pre-set programed counter 54 includes two counter units 54A and 54B interconnected by a plurality of conductor lines 54C. The unit 54A is preferably a two digit pre-set counter and the unit 54B is preferably a two level stepping switch having 40 positions. Acceptable units are standard Durant "unipulsers." As these are well-known units, they and their obvious interconnects are not depicted in detail.

A cumulative counter 111 and message band counter 113 are preferably provided having activating switches 112 and 114 respectively connected to power sources such as the positive operating potential B+. This may be, for example 24V dc.

The switch 114 is controlled in common with switches 116, 118, 120 and 122 as signified by the dashed line 124. These switches 114, 116, 118, 120 and 122 are relay switches which are controlled by a coil 103. The coil 103 is in turn activated by the closing of a switch 70S mechanically coupled to the cutting head 74 of the lathe 70. The switch 70S connects a voltage source B+ through a relay coil 101 to ground.

The coil 101 is part of the relay unit 96 and functions, when energized by the closing of the switch 70S, to close two relay switches 96A and 96B. The switch 96A has its blade mechanically biased so as to normally make contact with a terminal connected to one side of a resistor 126, whose other side is connected to the source of positive potential B+. The switch blade is permanently electrically connected to a charging capacitor 128 whose other side is connected to ground. When the switch 96A connects the charging capacitor 128 to the resistor 126, the capacitor 128 is charged by current from the voltage source B+ through the resistor 126 to a predetermined level.

When the coil 101 is activated by the closing of the switch 70S, the blade of the switch 96A is moved to connect the charged capacitor 128 to a contact connected to a line 130. The line 130 is connected through a diode 132 to the coil 103, and through that coil 103 to ground. The diode 132 is a semi-conductor diode whose anode is connected to the line 130 and whose cathode is connected to one side of the coil 103. That same side of the coil 103 is also connected to the pre-set line 134 of the two digit pre-set counter 54A. It is further connected through the line 136 to the normally open terminal of the relay switch 118. The blade of the relay switch 118 is connected through a holding capacitor 138 to ground. The charge holding capacitor 138 is connected to the switch blade of the switch 118 and through the normally closed terminal thereof to one side of a resistor 140. The other side of the resistor 140 is connected a source of positive voltage B+.

Thus, when the coil 103 is energized, the switch 118 serves to break contact of the capacitor 138 with the voltage source B+ and resistor 140, and to connect that charged capacitor to the line 136. The charge holding capacitor 138 normally has a charge placed thereon. Energization of the relay coil 101 of the relay unit 96 initially communicates the charge on the capacitor 128 through the diode 132 to the coil 103. This pulse of current causes the relay switches 114, 116, 118, 120 and 122 to close. The closure of switch 118 communicates the charge from the capacitor 138 to the coil 103 to hold the coil energized for a sufficient time for reset of the counter 54A through switch 122.

The blade of the second relay switch 96B of the relay unit 96 is connected through an off-on switch 144 to a source of positive potential B+. The normally open (NO) terminal of switch 96B is connected through a line 146 to the recording electronics control unit 60. The normally closed (NC) terminal of the switch 96B is unconnected.

The unit 60 comprises a relay coil 201 which controls two relay switches 60A and 60B. The relay switch 60B is normally open except for energization of the relay coil 201, and is then closed to connect power to the record electronics unit 40 to activate that unit. The relay switch 60A normally closed (NC) terminal is connected to the line 146 while its normally open terminal is connected to one side of the coil 201. The other side of the coil 201 is grounded. The non-grounded side of the coil 201 is also connected to a line 148 which is in turn connected to the normally open (NO) terminal of a relay switch 104A. The switch 104A, whose NC terminal is unconnected, is controlled by a relay coil 104 which is connected between ground and a line 150. The line 150 is connected to the NO terminal of the relay switch 120. The blade of switch 120 is connected to a source of voltage B+. The line 150 is also connected to the blade of a second relay switch 104B which is also controlled by the coil 104. The NC terminal of the relay switch 104B is unconnected while its NO contact is connected to one side of a resistor 152. The other side of the resistor 152, is connected to the cathode of a semiconductor diode 154 whose anode is grounded, and also to a line 156. The line 156 is connected to one side of the NC reed switch 90B of the switch unit 92.

The other side of the NO relay switch 104A is connected to a line 158 and thus, to one side of a NO relay switch 102C which is controlled by a relay coil 102 which coil also controls another NO relay switch 102B and also the relay switch 112. The switch 102B serves to selectively connect the voltage source B+ with the count input of the unit 54A. The coil 102 also controls a fourth relay switch 102D which has a switch blade connected via capacitor 160 to ground. The NC and NO terminals of the switch 102D are respectively connected to the resistor 162 (which in turn is connected to source B+) and to one side of the relay coil 102. The other side of the relay coil 102 is grounded.

The ungrounded side of the relay coil 102 is further connected through a line 164 to one side of the first and NO reed switch 90A. The other side of both of the NO reed switch 90A and the NC reed switch 90B and a third NO reed switch 90C are connected in common to the line 146. Further, the switch blade of the relay switch 60A is connected permanently to one side of a resistor 166 whose other side is connected via a line 168 to the line 156.

The NO reed switch 90C is connected via a line 170 to a third NO relay switch 104C controlled by the relay coil 104. The other side of the relay switch 104C is connected via the line 55 to the tape transit control unit 48.

The line 55 is connected through the push button switch 53 to the source of potential B+ and also to one side of a relay coil 106 whose other side is grounded. The line 55 is also connected to one side of a coil 106 controlling NO relay switch 106C whose other side is connected to the line 174. The relay coil 106 also controls a pair of relay switches the NO switch 106B and the NC switch 106A. The relay switch 106A serves to selectively connect the voltage source B+ to the transport start-stop relay of the tape player 32 as indicated by the line 50 (as also shown in FIG. 2). The relay switch 106B serves to selectively connect the voltage source B+ through a resistor 178 to a line 180. The line 180 is connected through capacitor 182 to ground and also through a resistor 184 to the base of a transistor 185. The base of the transistor 185 is also connected through a biasing resistor 186 to ground. The transistor 185 is of the NPN type and has its emitter connected to ground. Its collector is connected to the base of a second NPN-type transistor 190 whose emitter is also connected to ground and whose collector is connected to one side of a relay coil 107. The other side of the relay coil 107 is connected to a source of positive potential B+. Across a relay coil 107 is connected a safety diode 107S whose cathode is connected to the side of the coil 107 which is connected to the positive voltage source.

The coil 107 controls a NC relay switch 107A which serves to connect and disconnect a source of positive voltage B+ to the line 174.

The base of the transistor 190 is further connected through a resistor 192 to ground and through a resistor 194 to the emitter of an NPN transistor 195. The collector of a transistor 195 is connected to a source of positive voltage B+ and the base of the transistor 195 is connected through a resistor 196 to ground. A capacitor 197 is connected in parallel to the resistor 196. The cathode of a diode 198 is also connected to the base of the transistor 195. The anode of the diode 198 is connected in turn through the cathode-anode circuit of a second diode 199 to ground and to one side of a capacitor 200. The other side of the capacitor 200 is connected through low pass filter comprising another capacitor 201 which is connected from the capacitor 200 to ground, also to a filter inductor 202 which has one side connected to the junction of the capacitors 201 and 202 and the other side connected to an input terminal 203, which, with the ground line, serves as the input 46 for the "stop" tone from the second channel of the tape recorder amplifier.

The pre-set program counter 54 also includes as part of its primary control a reset switch 210 for alternately connecting or not connecting a source of voltage B+ to the reset line of the unit 54B. Also provided is a control switch 211 for alternately by-passing or not by-passing the relay switch 122. The switch blades of the switches 210, 211 and 144 are preferably ganged together. The NO relay switch 122 serves to connect the reset line of the unit 54A to a source of ac power and the NO relay switch 116 serves to selectively connect positive dc potential B+ to the stop input of the unit 54B.

The above described system has been constructed and tested and has provided superior results.

OPERATION OF THE SYSTEM

In overall operation the system above described produces a master record disc 71 having a continuously spiraling groove containing a number (such as 40) of different messages, each message occupying a certain portion of one revolution (such as 320°) and each message being repeated on successive grooves a certain number of times (such as 20 to 22) before the next message is recorded. Furthermore, the angular starting point of each message on each revolution is essentially the same so as to provide proper synchronization when the record is played in a audio-visual or teaching machine.

The process of obtaining a tape with a plurality of messages preceded by the proper "stop" signals were explained in conjunction with FIG. 1. Therefore the operation of the system depicted in FIGS. 2, 3 and 4 will now be explained.

With special references to FIG. 2, in operation the tape 15 on the reel 20 is first fed through the tape player 32 and on to the take-up reel 21. A fresh master disc 72 is placed on the turntable 76. An actuating start signal from the push button 53 activates the control unit 48 to start the transport of the tape player 32. The tape is advanced until the first "stop" tone signal is picked up by the head 34 and fed, as signified by the line 42, to the amplifier 44, and from that amplified to, as signified by the line 46, the control unit 48. This activates the control relay and stops the tape transport of the tape player 36.

The system 10'' is then ready to cut the master record disc. The operator need only lower the cutting head 74 (FIG. 3) onto the master disc surface. This operates the relay unit 96 to allow the reed switch unit to transfer a signal indicating the positioning of the revolving turntable. When the unit 90 signifies that the turntable is in the proper orientation, the control relays 48 and 60 are operated by programed counter over lines 55 and 58. This causes the tape player 32 to advance the tape 15 past the playback head 34. Tape head 34 picks up the initial message which is communicated as signified by the line 36, amplified by the amplifier 38, and sent to the unit 40 which records it on the rotating magnetic tape 100, via the line 84 and the recording head 82R. At the same time any preexisting messages are erased by an erase signal from the unit 40, which signal is fed from line 86 to the erase head 82E.

After one revolution the reed switch unit 90 is actuated by the magnet 91 which action is communicated, as signified by the lines 94 and 94', to the pre-set programed counter unit 54. The unit 54 in turn controls, as signified by the line 58, the control relay 60 which turns off the record and erase heads 82R and 82E. During that same revolution the cutter head 74 inscribed the information recorded on the tape 100 which was picked up from the play head 82P and amplified in the amplifier 78. Thus, in the first revolution of the turntable since the initiation of the operation, the information relayed from the tape player 32 has been inscribed once on the record and stored on the tape 100. At the completion of this first turn, the pre-set programer unit 54 has turned off the record and erase heads 82R and 82E. As the turntable continues to rotate the same message will be inscribed on successive circular grooves made by the cutter head as the information continues to be picked up by the play head 82P from the tape 100. Further, as each revolution of the turntable 71 takes place the magnet 91 actuates the reed switch unit 90 which is relayed, as signified by the lines 94–94′, to the pre-set programed counter and control unit 54. The unit 54 functions to count the number of revolutions and thus the number of grooves cut with the same message into the record 72. When the desired number have been completed, the program counter unit 54 produces an output signal which as signified by the lines 58 and 55 activates the record and erase heads 82R and 82E and the recording amplifier and erase unit 40 and also the control unit 48 to start the tape transport and record the next message on the tape 100.

In the meantime, while the recording the re-recording of the first message on the record 72 from the tape 100 has been taking place, the tape transport 32 has continued to move the tape past the playback head 34 until a "stop" tone signal was picked up on the second channel. This "stop" signal was relayed, as signified by the line 42, to the amplifier 44, amplified thereby and applied over the line 46 to control relay unit 48 to stop the tape transport. Thus, the tape unit 32 has been stopped with the next complete message ready to be recorded. Had an abortive message been on the tape between the "stop" signal and the previous message, the tape machine would have advanced past it since there would be no "stop" signal or tone thereof. In this manner, the time for the multiple re-recording is effectively used to by-pass abortive messages and ready the tape transport for the next message.

When the output or start signal is present on line 55 and 58 the second message is transferred or picked up by the playback head 34 from the tape, amplified by the amplifier 38, and fed to the recorder amplifier and erase unit 40 which is activated by the relay signal on the line 58 through the relay 60 to erase the first message from the tape 100 and to record second message on that tape 100. During the same revolution the playback head 82P picks up the new message signal amplifies it in the amplifier 78 and feeds it to the cutting head 74. Thus, without stopping the turntable or the cutting head 74 process, the transfer from the reproduction of the first message to the second message occurs. The process is then continued to reproduce the second message on successive rotations of the turntable for a selected number of turns. When this number has been reached, the programing unit 54 produces an output signal on lines 55 and 58 to control respectively the control relay 48 and 60 to thereby transfer the third message to the tape 100 and thus to the third set of grooves or bands in the record 72. Again sufficient time has been allowed, during the multiple cycling of the turntable 71 for the required number of grooves or bands, to allow the tape player unit 32 to have by-passed abortive messages that may be contained thereon and to reach the next "stop" signal indicating a successful message. In this manner, the cutting of the record disc 72 may be achieved without unnecessary delay and in an automatic manner without the intercession of human supervision or action.

It should be noted that the provision of the magnet 91 in a fixed position on the turntable 71 and thus relative to the record disc 72 together with the fixed position of the playing or recording head unit 82 insures that each successive message will start and stop at approximately the same angular position on the master record 72.

The recording head 82 is preferably mounted so that it is to be easily removed from the area of the turntable when not in use or when it is desired to replace the strip of tape 100. It is preferred that the strip 100 be of ordinary high quality recording tape such as might be used for the tape in the record player or tape player 32 and is preferably physically attached to a backing of foam material in a groove formed in the outer periphery of the turntable 71.

With special reference to FIG. 4, the following is the sequence of operation of this particular system embodying the invention.

SEQUENCE OF OPERATION

I. The ganged COUNT switches 210, 211, and 144 are placed in the COUNT position. The switch 211 disconnects a source of 24V ac from the reset circuit of the pre-set counter 54A. The switch 210 disconnects a source of B+ (24V dc) from the reset circuit of the stepping switch 54B. The switch 144 connects a source of B+ (24V dc) to the blade contact of the switch 96B.

II. The operator lowers the cutter head 74 of the lathe 70, closing a contact which supplies B+ (+24V) to energize coil 101, the "enable relay." Switch 96A discharges the capacitor 128 through the diode 132 into the coil 103, energizing it momentarily.

III. The switch 122 applies 24V ac to the pre-set counter to reset it to zero. The switch 120 energizes the coil 104. The switch 116 causes the stepping switch 54B to move from "home" to the first position for the first message band. The switch 114 advances the message band counter 113 to read 1.

The stepping switch 54B contacts are wired in conjunction with the pre-set counter 54A so that for each position of the stepping switch corresponding to a particular message band, a pre-set count signal will be obtained when the pre-set counter has reached a count equal to the proper number of messages for that band.

IV. The relay coil 104 is held energized through the holding circuit made up of switch 104B, the resistor 152, the reed switch 90B and the switch 96B. The switch 104A readys the circuit to energize coil 201. The switch 104C readys the circuit to energize coil 106.

V. When the magnet 91, on the turntable 71 passes reed switch 90C, that switch closes, energizing the coil 106. This, in turn, through the switch 106A starts the tape transport 32 to play the first message. The switch 106C completes a holding circuit to maintain the coil 106 energized. The switch 106B removes a source of B+ from the capacitor 182 in the base circuit of transistor 185. The voltage on this capacitor 182 then discharges until after some delay of, for example about 0.5 seconds, the transistor 185 no longer conducts, effectively removing a short circuit from the input of the transistor 190. The purpose of this circuit is to prevent premature stopping of the tape transport of the tape player 32 when, upon start-up, there is still a portion of the stop tone passing the playback head. The transistor 195 effectively disables the stop circuit for the first half-second after starting the tape transport.

VI. Next the magnet 91 passes the reed switch 90B. This switch opens, but at this time coil 104 remains energized through the normally closed (NC) contact of switch 60A of the relay unit 60.

VII. The reed switch 90A closes as the magnet 91 passes it, energizing the coil 102. The switch 112 operates the cumulative counter and contact switch 102B operates the pre-set counter. The switch 102C, through switch 104A, energizes coil 201 which puts record amplifier and erase unit 40, in the record mode. Switch 102D discharges the capacitor 160 into the coil 102, keeping it energized for a somewhat longer time than the reed switch 90A would otherwise keep it.

VIII. When the coil 201 is energized, the switch 201A completes a holding circuit for it through the NC reed switch 90B. Thus, the coil 201 remains energized and the record amplifier unit 40 remains in the record mode for one revolution of the turntable until the reed switch 90B is opened, at which time the coil 201 de-energizes and the system is taken out of the record mode.

At the completion of one revolution of the turntable when reed switch 90B opens, it also breaks the holding circuit for coil 104, causing it to drop out.

IX. When the tape transport advances to the next stop tone on the tape, the tone passes through the low-pass filter, is rectified, amplified by transistors 195 and 190 and operates relay coil 107. The contact of the relay switch 107A breaks the holding circuit for coil 106, causing it to drop out, thus stopping the tape transport.

X. On successive revolutions of the turntable, the reed switch 90A energizes coil 102 which in turn operates the pre-set counter and the cumulative counter.

XI. When the count of the pre-set counter reaches the number programed by the stepping switch for that particular message band, the circuit is completed and B+ voltage appears at the pre-set lead which energizes the coil 103. Contact switch 118 discharges the capacitor 138 into the coil 103 to maintain it energized long enough for the stepping switch to operate. The cycle now repeats itself starting with Step III above.

When the cutting head 74 reaches an adjustable predetermined set point in its travel corresponding to the end of the last groove it automatically opens the switch 70S and thus shuts down the system 10.

In the above described system it should be noted that the pre-programed number of repeat cycles of the unit controlled by the unit 54 may be altered to produce different numbers of message units for different bands on the record. Also it should be noted that various alternative arrangements may be employed. For example, a magnetic drum might be employed as an alternative to the magnetic tape 100. The drum could be mounted on the outside periphery of the turntable 71 or could be located elsewhere and operated in synchronism with the turntable 71 as by mechanical linkage or otherwise. Another alternative is to use a tape loop in a drive system synchronized to that of the turntable, provided that the length of the tape loop is proportionately correct so that it comprises exactly one circuit for every one revolution of the turntable.

As should now be apparent a new and improved recording system has been described which has may advantageous features. Although perhaps capable of more general application the present invention is of special utility in the production of master record discs for the production of record discs for use with audio-visual equipment. The system effectively uses cutting time to by-pass abortive messages and insure accurate repeating of messages in both content and angular position. The present invention thus, provides an automatic and thus economic and time saving recording system.

Various of the features of the invention have been particularly shown and described, however, it should be obvious to one skilled in the art that various modifications may be made therein without departing from the scope of the invention.

What is claimed is:

1. A method for the production of a record disc having a spiral groove of a large number of turns which turns are divided into a plurality of bands each band containing a repeated message, each message of which band starts at approximately the same radial position on the disc, comprising the steps of:

a. providing a recording device;

b. recording a plurality of messages on the recording device;

c. providing a cycling recording media;

d. playing the recording device to reproduce a first message and recording the reproduced first message on the cycling recording media; said recording starting at approximately one particular point of the cycling media;

e. providing a record groove cutter;

f. controlling the record groove cutter and the cycling media so that they cycle together;

g. using the cycling first message of the recording media for a predetermined number of successive cycles for cutting that number of turns into the record disc;

h. playing the recording device to produce a second message while erasing the first message on the cycling media and recording the second message thereon, and i. using the cycling second message of the recording media for a predetermined number of cycles for cutting a second plurality of turns into the disc, the recording of said second message starting at approximately the same particular point of the cycling media as the first message;

whereby successive messages recorded on the disc start at approximately the same radial position.

2. An apparatus for the cutting of record discs comprising:

a record lathe having a turntable for rotation and a cutting head; and a recording and playing device comprising:

an erasable recording cycling media, an input for receiving messages and recording them on said media, an erase input for erasing any messages thereon and a play output for reproducing any messages, said cycling media having a cycle equal to the cycle of the turntable of said lathe, and means for coupling the play output of said cycling media to the cutting head of said lathe for the transfer of messages thereto so that those messages may be cut into a record disc with each beginning after approximately the same radial position of the record disc;

whereby messages may be erasably recorded on said cycling media and repeatedly cut in successive turns into a record disc on the turntable by the cutting head.

3. The apparatus for cutting of record discs, as defined in claim 2, wherein:

said erasable recording cycling media is of the magnetic recording type and is coupled to the turntable of said lathe to cycle therewith.

4. The apparatus for cutting of record discs, as defined in claim 3, wherein:

said magnetic recording cycling media is magnetic recording tape which is coupled to the turntable of said lathe by being secured about the outer rim of the turntable.

5. A system for the production of a message bearing tape and the automatic cutting of a record disc of the type having a plurality of successive message bands each having a predetermined number of repeated messages in adjacent grooves thereof, with each message thereof starting at a predetermined angular position on said record and ending in less than one cycle thereof, comprising:

a first stage (10') for the production of a magnetic tape having a plurality of successful messages thereon, each of which has a "stop" tone signal preceeding it, comprising:

a tape recorder (12) capable of recording on a magnetic tape (15) and equipped with a recording head (16) at one point in the tape transport and an erase head at another point (18) in the tape transport, said another point being located at a tape travel distance away from said one point approximately equal to the length of travel of the tape during the predetermined maximum message period;

a message station (22) at which oral messages are converted to electronic signals which are coupled to said recording head of said tape recorder; and a judging station (24) which has means for producing a "stop" low frequency tone electric signal which is coupled to the recording head for recording on said tape and which has means for producing an erase signal coupled to said erase head for erasing the stop signal should the message run over time or otherwise not be successful;

a second stage (10'') for the cutting of the disc from the tape produced in the first stage, comprising:

a tape player (32) having a playing head (34) for playing said tape (15) having a tape transport that is controlled to drive and not to drive said tape at a playing speed;

means (48) for controlling said tape transport, including means coupled to said tape playing head including a low pass filter (201, 202) and amplifier devices (195, 190) for selecting the "stop" signal and amplifying it, and a means (107, 107A) for stopping the tape drive of said tape player (32) when a "stop" signal is sensed; and means (70, 54, 92, 96) for repeatedly cutting for a predetermined number of times each of the individual messages played off of the tape onto a record disc and for generating a command signal to said tape player-tape drive mechanism, whereby a message is played and the drive mechanism advances the tape until the next "-stop" signal is sensed by said tape transport controlling means.

6. The system for the automatic cutting of a record disc of the type having a plurality of successive message bands each having a predetermined number of repeated messages in adjacent grooves thereof, with each message thereof starting at a predetermined angular position on said record and ending in less than one cycle thereof, as defined in claim 5 wherein:

said means for repeatedly cutting messages onto a record disc includes:

a pre-programed means (54) including a unit for counting the number of repeated messages and for activating said tape control transport means by generating a command signal thereto when the number reaches a predetermined value;

a record lathe (70) having a turntable (71) for rotation of the record disc, and a cutting head (74) for cutting a recording groove thereon; and an erasable recording cycling media (100) having an input (82R) for receiving messages, an erase input (82E) for erasing any messages thereon and a play output (82P) for reproducing any messages, said cycling media having a cycle equal to the cycle of the turntable of said lathe and having its play output coupled to the cutting head of said lathe, whereby messages may be erasably recorded on said cycling media and repeatedly cut in successive turns into a record disc on the turntable by the cutting head, said erasable recording cycling media of the magnetic recording type and is coupled to the turntable of said lathe to cycle therewith, and said magnetic recording cycling media is magnetic recording tape which is coupled to the turntable of said lathe by being secured about the outer rim of the turntable.

7. The system for the automatic cutting of a record disc of the type having a plurality of successive message bands each having a predetermined number of repeated messages in adjacent grooves thereof, with each message thereof starting at a predetermined angular position on said record and ending in less than one cycle thereof, as defined in claim 6, wherein:

said turntable further includes a switch activator (91) rotating therewith for activating at least one counting switch (90) with every revolution thereof, coupled to said pre-programed means, said switch activator is a magnet;

said at least one counting switch is a reed switch;

two additional reed switches are provided for activation by said magnet;

one of said reed switches functions to count individual turns of said turntable, and another of said reed switches functions to command the start of said tape drive.

8. A system for the cutting of a phonograph record disc comprising:

a source of pre-timed maximum length messages, means for activating said message source to produce sequentially different pre-timed messages, each upon a command signal, a record disc-cutting lathe having a rotating turntable for supporting a record disc and a cutting head for cutting recording grooves therein, means including a cycling magnetic recording media, an erase unit for erasing any signals thereon, a record unit for recording thereon and a play unit for picking up any signals thereon, said cycling magnetic recording media having a cycle related to the rotating cycle of said turntable and said play unit being actively coupled to said cutting head to transfer information thereto for recording thereby in the record grooves; and pre-programed means for coupling and de-coupling said message source to said magnetic recording media, for commanding said source to produce a message for recording on said magnetic recording media, and for operating said erase unit whereby successive messages may be transferred to said cycling magnetic recording media and repeatedly cut into the record by said lathe for a predetermined number of times.

9. The system for the cutting of a phonograph record disc, as defined in claim 8, wherein:

said source of pre-timed maximum length messages is a tape recorder having a tape with the messages recorded thereon preceeded by a "stop" signal; and said activating means for said message source includes means for continuing the drive of the tape after delivering a message until a "stop" signal is reached and for then stopping the tape drive until a command signal occurs.

10. The system for the cutting of a phonograph record disc, as defined in claim 9, wherein:

said magnetic recording cycling media is magnetic recording tape which is coupled to the turntable of said lathe by being secured about the outer rim of the turntable, and said turntable further includes a switch activator rotating therewith for activating at least one counting switch with every revolution thereof, said switch being coupled to said pre-programed means.

11. The system for the cutting of a phonograph record disc, as defined in claim 10, wherein:

said switch activator is a magnet;

said at least one counting switch is a reed switch;

two additional reed switches are provided for activation by said magnet;

one of said reed switches functions to count individual turns of said turntable; and another of said reed switches functions to command the start of said tape drive.

* * * * *